Feb. 28, 1928.
L. FAZEKAS
1,660,419
EMERGENCY BRAKE AND SIGNALING DEVICE FOR MOTOR CARS
Filed Feb. 12, 1927
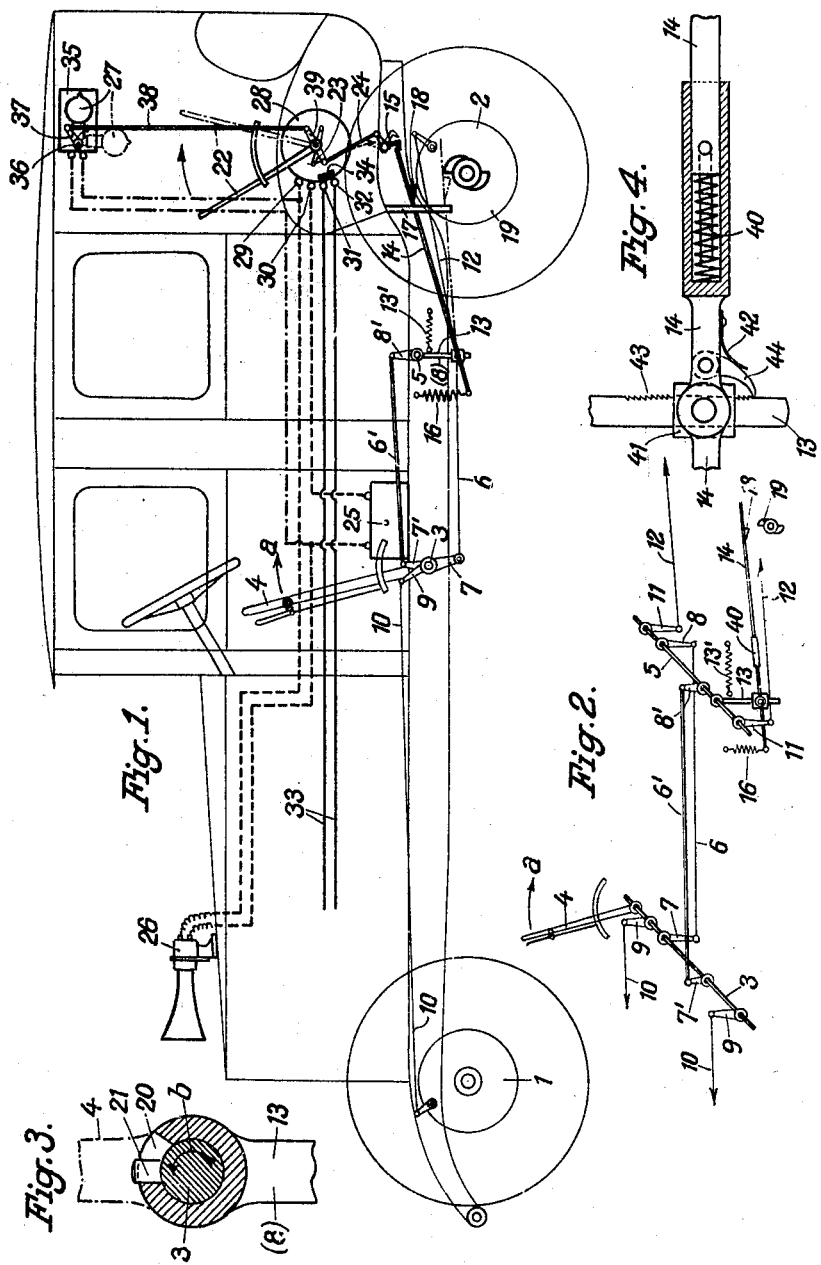
Inventor:
Leopold Fazekas
BY: Buey, Boyce & Bakelew
ATTORNEYS.

Patented Feb. 28, 1928.

1,660,419

UNITED STATES PATENT OFFICE.

LEOPOLD FAZEKAS, OF KALOCSA, HUNGARY.

EMERGENCY BRAKE AND SIGNALING DEVICE FOR MOTOR CARS.

Application filed February 18, 1927, Serial No. 169,307, and in Hungary December 30, 1926.

This invention relates to an emergency brake and signaling device for motor cars, which enables the passenger in cases of emergency, for instance should anything happen to the driver, so that the car becomes driverless, or should any danger threaten the passenger through some action of the driver or through some other cause, to bring the car to a standstill from his own seat, independently of the driver, by means of a separate, second brake operating device and at the same time by audible or visible signals to call the attention of passers-by or the police to the fact that something is not in order or that the occupants of the car are threatened in some way by danger.

This emergency brake and signaling device which is entirely independent of the ordinary brake and signaling devices operated from the driver's seat consists according to the present invention of a device which is located in the interior of the car within reach of the passenger and is capable of being operated by actuating means which are secured when in the inoperative position like the handles of railway carriage emergency signaling devices by a lead seal against improper use, which is to be broken in cases of emergency, either by interrupting the ignition circuit of the motor and thereby stopping the motor or by connecting up a siren, as an audible signal, or a lamp or other noticeable signal, as a visible emergency signal in the circuit of a battery or accumulator and at the same time releasing a second brake operating device which is independent of the driver's brake from its inoperative position and coupling the same with some moving part of the car gearing or with a separate electrically or spring-operated motor which imparts to the said emergency brake device a motion which intermittently operates the existing brakes. This emergency brake arrangement which can be made not only in accordance with the various types of cars but also in the most varied manner, as well as the engine which has been put out of operation, but still continues to run idly and therefore exerts a braking action, thus making it possible to bring the car to rest in a very short time independently of the driver, while the two signals, the acoustic and optical signal, are at the same time intended to call for help.

In the accompanying drawing a constructional example of such an emergency brake and signaling device according to the present invention is shown diagrammatically, Figure 1 being a general view showing the device applied to a motor car, Figure 2 a diagrammatic view showing the relative arrangement of the existing brake arrangement and of the emergency brake arrangement.

Figures 3 and 4 show details of the emergency brake arrangement.

In Figure 1 of the drawing the motor car and the ordinary brake arrangement to be operated by the driver are shown in thin lines, the emergency brake and signaling device forming the subject of the present invention being indicated by thicker lines. The former brake arrangement consists, as shown in Figures 1 and 2, of the well-known front wheel brakes 1, the rear wheel brakes 2, the driver's brake lever 4 mounted on the forward brake shaft 3, the rear brake shaft 5, the connecting bar 6 connecting the two brake shafts 3 and 5 and connected to the lever arms 7 and 8 of the brake shafts 3 and 5. The forward brake shaft 3 is connected by two arms 9 mounted thereon and connecting bars 10 to the front wheel brakes 1, while the rear brake shaft 5 is connected by the levers 11 mounted thereon and connecting bars 12 to the rear wheel brakes 2. Thus, by moving the brake lever 4 in the direction of the arrow $a$ all the brakes are simultaneously applied by the arrangement just described. On the lever 4 being released, the shafts 3 and 5 and the lever 4 itself, are returned by the springs which release the brakes by means of the connecting bars 10, 12 and 6 into their inoperative position, which circumstance is made use of in the emergency brake arrangement to be described below. The emergency brake device forming part of the present invention is actually a second, automatic operating means for the above described well-known brake arrangement, which is so constructed that it is normally always secured in the inoperative position by a locking device which can only be released by the passenger and, when in this position, cannot in any way interfere with the normal operation of the brakes by the driver and conversely cannot be in any way influenced by the normal operation of the brakes, while, when released from the inoperative position and becoming operative, it automatically operates the entire brake arrangement, although the driver's brake lever 4 is locked.

The emergency brake arrangement consists substantially of a lever arm 13 mounted on one of the brake shafts 3 or 5, in the example shown for instance on the shaft 5, to which lever 13 a push bar 14 is pivoted, the unsupported end of which, when in the inoperative position is held up by a detent 15 in opposition to a spring 16 which seeks to rock the push bar 14, downwards, and is secured in this position. A tension spring $13^1$ which acts on the lever arm 13 and consequently pushes the pull bar 14 against the detent 15, secures the push bar 14 in the locked position. The push bar 14 which is guided in a vertical slotted guide 17 is provided at a distance from its end with a lug 18 which, when the detent 15 is released and the push 14 is thereupon rocked downwards by the spring 16 (as shown in Fig. 1 in dot and dash lines), engages with a cam wheel 19 keyed to the rear wheel axle, whereby the push bar 14 which is under the action of the spring $13^1$ which pushes it rearwards has a to-and-fro motion imparted to it, thereby intermittently operating the brakes through the lever arm 13, until the car comes to a standstill. Obviously the to-and-fro motion of the push bar 14 can be derived in any other way from any other moving member of the car or by an electric or spring operated motor, without departing in any way from the spirit of the invention. For enabling the brakes to be applied in this intermittent manner independently of the driver's brake lever 4 which continues to be locked and independently of the transmission means 6, 7, 8 which coacts with the said lever, the hubs of the brake lever 4 and of the lever arm 8 on the brake shaft 5, which is operated by the said brake lever, and the hub of the lever arm 13 are so constructed that the brake shafts 3 and 5 can turn freely in the said hubs in the opposite direction to that of the arrow $b$ (Fig. 3) in which direction they are stressed through the rods 6 and 10, 10 or 12, 12 by the springs which release the brakes, when carrying the respective lever arms around with them, while, conversely the lever arms 4, 8 or 13, when turned in the opposite direction to that of the arrow $b$, carry the brake shafts 3 and 5 around with them, thereby operating the brakes. For this purpose the hubs of the levers 4, 8 and 13 are provided, as shown in Figure 3, in a very simple manner with an elongated slot 20 extending in the direction of rotation, in which the driving pin 21 fixed in the brake shaft 3 or 4 respectively engages, which, owing to the brake shaft being loaded so as to have a tendency to turn in the direction $b$, always rests against that end of the corresponding slot 20 which leads in the direction $b$. The two brake shafts 3 and 5 are provided with rigid arms $7^1$ and $8^1$ which are oppositely directed to the arms 7 and 8 and which are connected together by a connecting bar $6^1$. This connection $6^1$, $7^1$, $8^1$ serves the purpose of transmitting the braking motion initiated by the lever arm 13 to the brake shaft 3, in which case the latter turns freely in the hub of the locked driver's brake lever 4 and the brake shaft 5 in the hub of the lever arm 8, while, when the brakes are operated normally by means of the lever 4, only the brake shaft 5 turns freely in the hub of the lever arm 13 of the emergency brake of the engine. From this it will be clear that both brake arrangements can function entirely independently of one another.

The emergency brake arrangement described above is released or put in operation in case of emergency by a lever 22 pivotally mounted within reach of the passenger. For this purpose an arm 23 mounted coaxially with the lever 22 so as to rock with the latter is coupled to the free arm of the cranked detent 15 of the push bar 14 by means of a connecting bar 24. The lever 22 itself is normally secured in its inoperative position against improper use by a seal which can be broken. On the lever 22 being turned in case of emergency into the position shown in dot and dash lines, the seal being torn (Fig. 1), the detent 15 is turned by means of the arm 23 and the pull bar 24 into the position shown in broken lines and releases the end of the push bar 14 which in the manner already described engages under the action of the spring 16 with the cam disc 19 and intermittently operates the brakes as long as the car continues to run. With the emergency brake arrangement just described emergency signals and an arrangement for stopping the engine are connected, all these arrangements coming into operation along with the emergency brake arrangement. The emergency signals consist of an acoustic and optical signal, which, on the emergency brake being released, are connected up by the lever 22 in the circuit of an accumulator or a battery 25, and the arrangement for stopping the engine consists of a contact device in the ignition circuit of the engine, which can be interrupted by the lever 22. The acoustic emergency signal for instance of an electric siren 26 and the optical emergency signal for instance a coloured electric lamp 27 both are connected up in the circuit of the battery 25 in parallel. One of the battery leads is interrupted by contacts 29, 30 which slide on a commutator disc 28 mounted on the rotary shaft of the lever 22. To two other contacts 31 and 32, which also slide on the commutator disc 28, the ignition circuit 33 of the engine is connected. The commutator disc 28 is provided with a contact plate 24 which in the position of rest of the lever 22 keeps the contacts 31, 32 closed and thereby keeps the engine ignition intact. The other two contacts 29 and 30 rest against the insulated part of the disc 28, the emergency signals 26 and 27 thus being disconnected. However on the emergency lever 22 being turned for releasing the emergency brake in the direction of the arrow into the position indicated by broken lines, the disc 28 is also turned, the contact plate 34 on the disc leaves the contacts 31, 32, thus interrupting the ignition circuit 33 of the engine, and stopping the same, and the contact plate 34 comes in contact with the contacts 29, 30 which it closes, thereby connecting up the two emergency signals 26 and 27 in the circuit of the battery 25 and putting them into operation. The lamp 27 is preferably mounted in a box or casing 35 so as to rotate about the shaft 36, the arrangement being such that the lamp is normally hidden in the box 35, but is turned out of the box, on being switched on or put in operation, and is only thereby made visible. For this purpose an arm 37 mounted on the shaft 36 of the lamp 27 is coupled by a bar 38 to a second arm 39 on the rotary shaft of the emergency lever 22 which, on the emergency lever 22 being operated, turns the lamp 27 downwards out of the casing 35 and renders it visible.

Through the interruption of the ignition circuit of the engine, which is effected simultaneously with the release of the emergency brake arrangement by means of the lever 22, and the consequent stopping of the engine the action of the emergency brake arrangement is considerably assisted, as the engine is driven by the rear wheels which are still running and through the friction and the continuous compression itself has a strong braking action. The push bar 14 is preferably so constructed that the successive pushes which are exerted by it and operate the brakes do not give a hard blow, but act in an elastic manner, so as to avoid the danger of fracture and to cause these blows to increase continuously in strength. The former is effected by the provision of a buffer spring 40 in the push bar 14, as shown in Figure 4, and the latter by the stroke of the lever arm 13 on the brake shaft 5 actuated by the push bar 14, being caused to increase gradually through the constant displacement of the point at which the push bar 14 acts. For this purpose the push bar 14 is not pivoted directly to the lever arm 13, but to a sleeve 41 which is slidable on the same (Fig. 4) and on the push bar 14, close to the said sleeve 41 a downwardly directed pawl 44 is pivoted, which is kept in engagement by a spring 42 with the ratchet teeth 43 provided on the frame 13, and which slides the sleeve 41 at each stroke of the arm 13 through a certain distance along the arm 13 towards the pivot of the same, and consequently the point at which the push bar 14 acts, so that the stroke of the lever arm 13 and with it the brake force constantly increases.

It is not necessary to give any further detailed description of how the emergency brake and signaling device act, as this will be clear from the above description of the arrangement. It may be mentioned however, that an arrangement is also provided, not shown in the drawing, which is capable of being put into operation by the means within the car for putting the emergency brake and signaling arrangements into operation and which makes it possible in case of emergency to control the steering mechanism of the car as well from the interior of the car.

What I claim is:

1. An emergency brake and signaling arrangement for motor cars carrying passengers, characterized by a second automatic brake operating device which is quite independent of the ordinary brake and signal operating devices to be operated by the driver, and by a separate acoustic and a separate optical emergency signal and also characterized by a controlling member mounted inside the car within reach of the passenger and secured in its inoperative position against improper use by a lead seal which can be broken, which controlling member is connected on the one hand by a lever and pull bar mechanism with a locking member for keeping a second brake operating arrangement in the inoperative position and with the optical emergency signal and on the other hand with an electric contact device which, when in the inoperative position, keeps the ignition circuit of the engine of the car closed and another circuit for operating the acoustic and optical emergency signal interrupted, but which, when moved out of its inoperative position, releases the locking member of the second brake operating device and thereby connects the latter to a rotatable member, which puts the second brake operating device in operation, the optical emergency signal into a visible position and at the same time sets the contact device in such a manner that it interrupts the ignition circuit and closes the circuit operating the two emergency signals.

2. A constructional form of the second operating means for the brake claimed in claim 1, characterized by a push bar pivotally connected at one end to a lever arm mounted on one of the brake shafts, the other end of which push bar is provided with a lug and is kept raised, when in the inoperative position, by the locking member which is capable of being released by the controlling member within the car in opposition to a spring tending to force it downwards, but which, when released by the locking member, engages by means of its lug with a cam disc turning with a rotating part of the car and thereby intermittently operates the brakes.

3. A constructional form of the intermittent push bar mechanism as claimed in claim 2, characterized by the feature that the push bar is not pivoted directly to the lever arm of the brake lever, but to a sleeve sliding on the same, which sleeve is pushed closer to the axis of rotation of the lever arm by a ratchet mechanism at each stroke of the push bar, for the purpose of constantly increasing the throw of the said lever and with it the pressure, with which the brakes are applied.

4. A constructional form of the push bar as claimed in claim 2, characterized by the feature that the said bar is made in two parts and that between the said two parts a buffer spring is introduced, which renders the blow dealt by the push bar elastic.

5. A constructional form of the second brake operating device, as claimed in claim 2, characterized by the feature that the lever arm operated by the push bar and the ordinary brake lever to be operated by the driver and one of the lever arms coupling the two brake shafts with one another, are arranged, for preventing the ordinary brake operating mechanism acting on the second brake operating mechanism and vice versa, so as to have their hubs capable of rocking freely on the brake shafts in the opposite direction to their operative direction, while, in the operative direction they carry the brake shafts round with them.

6. A constructional form of the arrangement as claimed in claim 1, in combination with an arrangement capable of being put in operation by the controlling member mounted within the car for actuating the emergency brake and signaling arrangement, by means of which the steering mechanism of the car can be controlled independently of the driver from within the car as well.

In testimony whereof I have signed my name to this specification.

LEOPOLD FAZEKAS.